(12) United States Patent
Hansen

(10) Patent No.: US 9,694,621 B2
(45) Date of Patent: Jul. 4, 2017

(54) METHOD FOR PRODUCING AN APPLICATOR, AND APPLICATOR

(71) Applicant: Bernd Hansen, Sulzbach-Laufen (DE)

(72) Inventor: Bernd Hansen, Sulzbach-Laufen (DE)

( * ) Notice: Subject to any disclaimer, the term of this patent is extended or adjusted under 35 U.S.C. 154(b) by 23 days.

(21) Appl. No.: 14/435,889

(22) PCT Filed: Jan. 10, 2014

(86) PCT No.: PCT/EP2014/000041
§ 371 (c)(1),
(2) Date: Apr. 15, 2015

(87) PCT Pub. No.: WO2014/114429
PCT Pub. Date: Jul. 31, 2014

(65) Prior Publication Data
US 2015/0266333 A1    Sep. 24, 2015

(30) Foreign Application Priority Data
Jan. 24, 2013  (DE) .................. 10 2013 001 182

(51) Int. Cl.
*A45D 34/04*  (2006.01)
*B43K 15/02*  (2006.01)
(Continued)

(52) U.S. Cl.
CPC .............. *B43K 15/02* (2013.01); *B43K 8/003* (2013.01); *B43K 8/026* (2013.01); *B43K 8/06* (2013.01);
(Continued)

(58) Field of Classification Search
None
See application file for complete search history.

(56) References Cited

U.S. PATENT DOCUMENTS 6,692,173 B2 * 2/2004 Gueret ................ A45D 34/043
401/152
6,749,796 B1 * 6/2004 Hansen ............... B29C 47/0028
264/524

FOREIGN PATENT DOCUMENTS

DE   10 2012 107 045 A1   2/2014
EP    1 847 242 A1   10/2007
(Continued)

*Primary Examiner* — David Walczak
*Assistant Examiner* — Joshua Wiljanen
(74) *Attorney, Agent, or Firm* — Wenderoth, Lind & Ponack, L.L.P.

(57) ABSTRACT

A method produces an applicator for applying liquid or pasty media (1), having a container (3) storing the medium (1), and an application element (5, 13) attached to the container (3) in a usage position such that the application element provides the medium (1) for application outside the container (3) by capillary action. A hose of thermoplastic plastic is extruded and inserted into a mold, forming a container (3) closed at the bottom by expanding the hose in the mold. The container (3) located in the mold is filled with the medium (1). The container (3) is separated from the hose to form an opening accessible at the top side of the container (3). The application element (5, 13) is put into the usage position by inserting the application element through the opening of the hose and fastening the application element (5, 13) while simultaneously creating a closure of the container (3) by moving movable mold parts of the mold.

11 Claims, 3 Drawing Sheets

(51) Int. Cl.
*B43K 8/00* (2006.01)
*B43K 8/02* (2006.01)
*B43K 8/06* (2006.01)
*B43K 23/12* (2006.01)
*B29C 49/04* (2006.01)

(52) U.S. Cl.
CPC .............. *B43K 23/12* (2013.01); *A45D 34/04* (2013.01); *B29C 49/04* (2013.01); *Y10T 29/49805* (2015.01)

(56) References Cited

FOREIGN PATENT DOCUMENTS

GB 2 105 250 A 3/1983
WO WO 91/18750 12/1991

\* cited by examiner

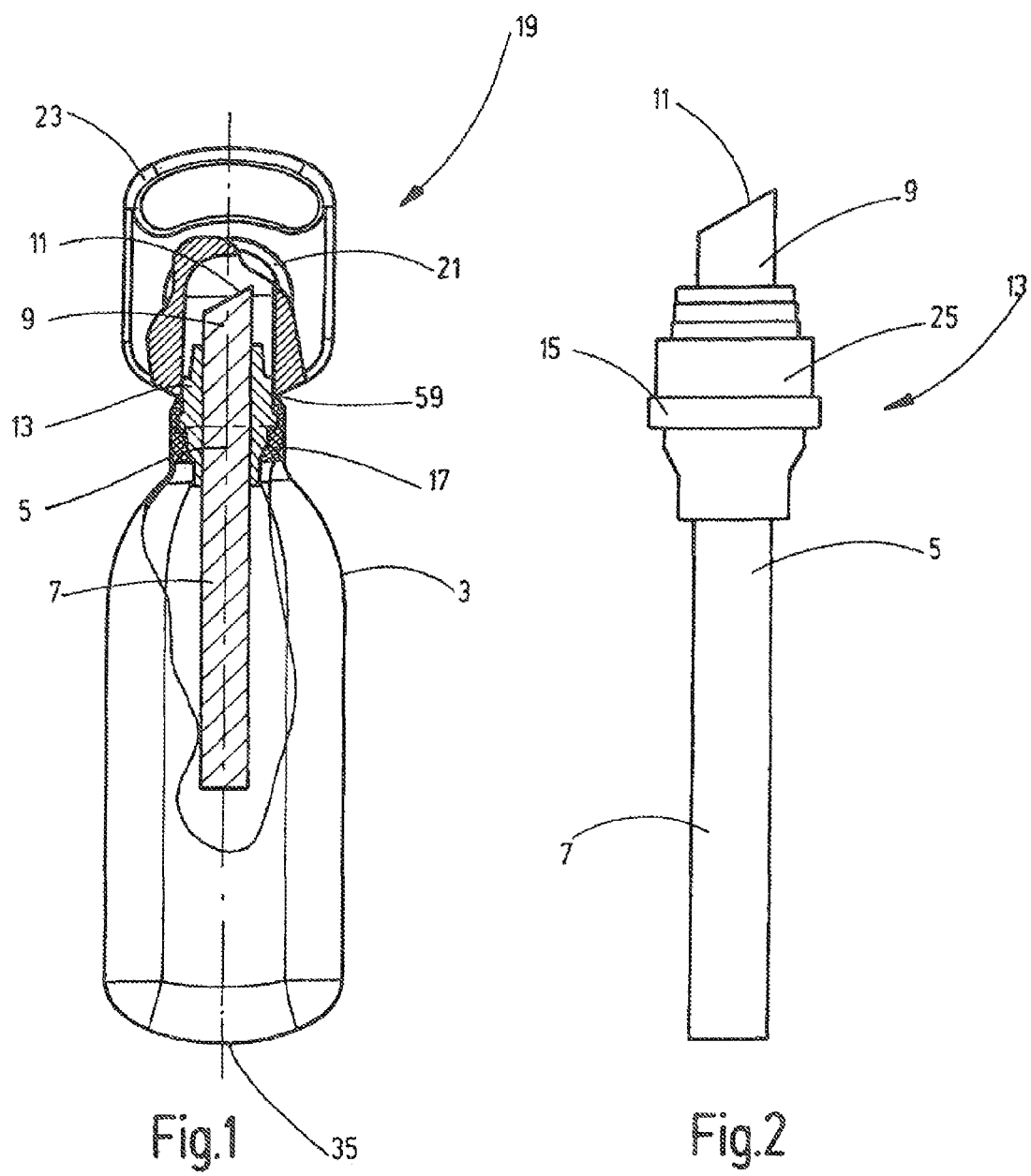

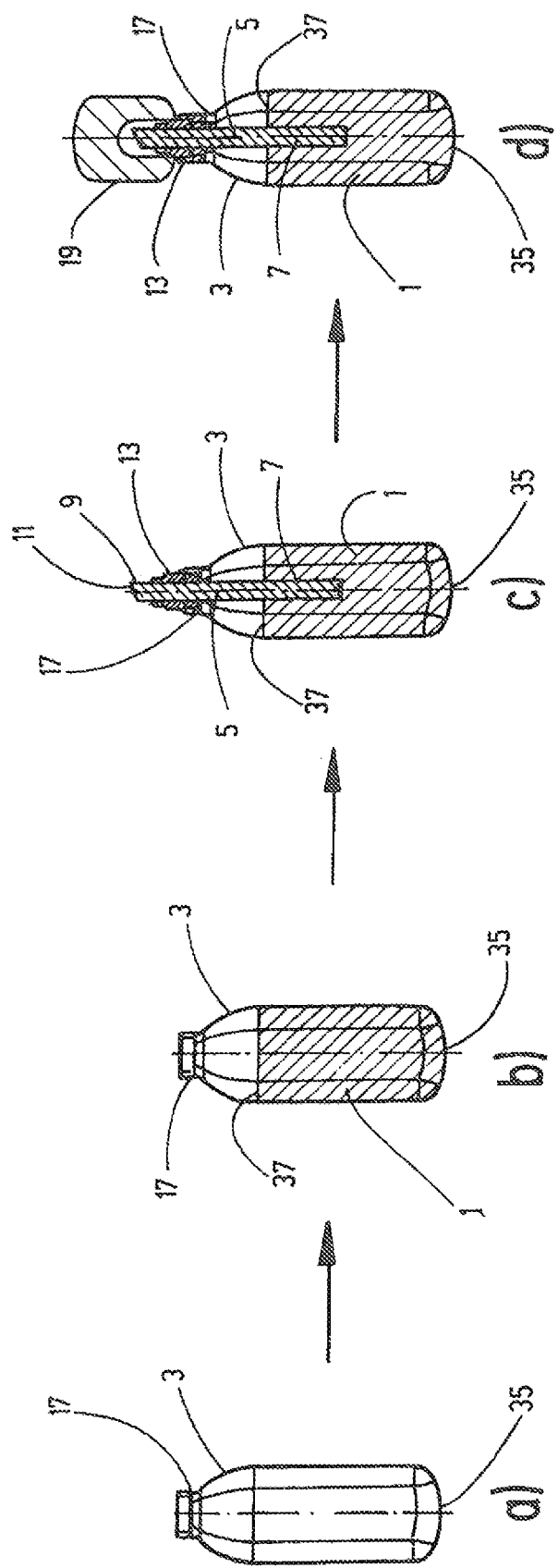

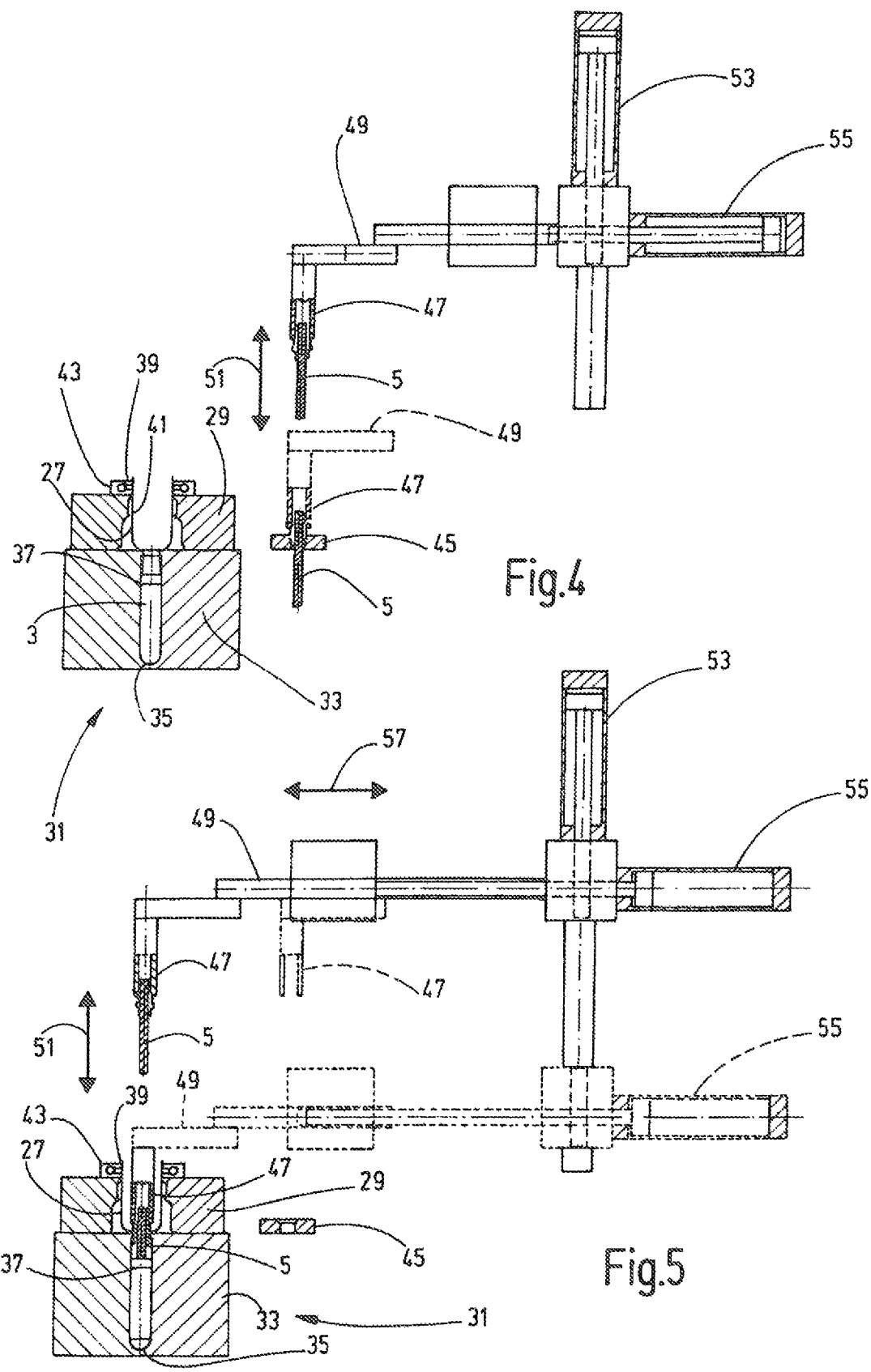

METHOD FOR PRODUCING AN APPLICATOR, AND APPLICATOR

FIELD OF THE INVENTION

The invention relates to a method for producing an applicator for applying fluid or pasty media, comprising a container, which stores the medium in question, and an application element, which is attached to the container in a usage position such that the application element provides the medium for application outside of the container through capillary action.

BACKGROUND OF THE INVENTION

Applicators of this generic type are used for writing, drawing or painting and are particularly widely used as marking devices in the form of markers for forming color markings, for example for sections of text or drawings that are to be highlighted. In view of this wide range of applications, applicators of this kind are produced in large quantities, so that the level of the production costs incurred is a significant factor.

SUMMARY OF THE INVENTION

An object of the invention is to provide an improved method, for producing applicators of this type in a particularly efficient and therefore, cost-effective manner.

This object is basically achieved according to the invention by a method where the container, which stores the medium, is formed from an extruded flexible tube of a thermoplastic plastic material. The tube is inserted into a mold and is expanded into a container in the mold. The container that is formed is then filled with the medium while the container is still inside the mold. In so doing, the invention exploits the production-related advantages of the known blow and fill process, permitting a particularly fast and efficient production of plastic containers, for example having an ampule form. In the case of mass production, an especially short production rhythm can be achieved because the essential production processes, such as forming the shape of the container, can be carried out by applying an overpressure and/or a vacuum, as well as filling, while the container is still located inside the mold in a plastic, and therefore adaptable state.

While the formed and at least partially filled container is still located in the mold, the invention further provides that, by separating the container from the extrusion tube at the upper side of the container, an opening is formed. The container is then accessible at its upper side for affixing the associated application element, in particular for inserting application element into the interior of the container. The application element, which is disposed in the usage position at the opening of the container, is affixed by a closing movement of movable mold parts. The malleable plastic material of the container is correspondingly molded, preferably to simultaneously form a closure to the container. This approach provides producing applicators at a higher speed of production so that large production numbers are particularly economically feasible.

The container can be advantageously formed in such a way that the flexible tube is inserted through the opened, movable head jaws of the mold into a lower mold, which forms the container. The head jaws are then closed to subsequently affix the inserted application element.

The configuration may be advantageously such that the inserted application element has a retaining element, which forms an enclosure for a capillary material. The capillary material is a, strip-shaped material or a band-shaped material of the application element extending between a feed section extending into the container when in the usage position and a delivery section located outside of the container for the application. The application element is affixed by molding the flexible tube on the retaining element by closing the head jaws.

Particularly advantageously, the flexible tube can be separated above the head jaws to form a section of the flexible tube that protrudes over the fixing point on the retaining element of the application element. As a result, a free section of the flexible tube is available on the upper side of the container, which free section of the tube provides a closure part, which encloses the delivery section of the application element, to be formed when closing the head jaws after inserting the application element.

Particularly advantageously, in this case, when molding the closure part, a predetermined breaking point is formed, at which the closure part, for example in the form of a cap formed in the manner of a toggle fastener, can be separated, and therefore removed, from the container.

To make the process of inserting the application element through the free section of the flexible tube, which is located above the container, simple and reliable, the protruding section of the flexible tube can be held open for the insertion of the application element in a defined shape by retaining jaws provided on the head jaws, by applying a vacuum to the outside of the protruding section of the flexible tube.

For use as a marker, the container may be provided with a marking fluid, which in particular also makes color markings possible, for example in a transparent form for highlighting text or the like.

The subject matter of the invention is also an applicator, which is produced using the method according to the method of the invention.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 1 is a front view, partially in section, which has been enlarged by approximately 1.5 times as compared to a practical embodiment, of an embodiment of the applicator produced according to the method according to the invention;

FIG. 2 is a front view of only the application element of the applicator, which has been further enlarged as compared to FIG. 1;

FIGS. 3a through 3d are schematic, front views illustrating the sequence of the method according to the invention; and FIGS. 4 and 5 are schematic front views partially in section of some parts of the device for an apparatus used to implement the method according to the invention.

DETAILED DESCRIPTION OF THE INVENTION

The invention is described below based on the example of the production of an applicator in the form of a marker, as is shown by way of example in FIG. 1. To receive marking fluid 1, which is not shown in FIG. 1 and which is only visible in FIGS. 3b through 3d, the applicator has a container 3 produced by blow molds out of a thermoplastic plastic material, for example polyethylene having a lower or higher density, or out of polypropylene. The broad side of the non-circular container 3 is visible in each of the FIGS. 1 and 3. The container, rather than having circular cylindrical shape, has an oval cross section. Nevertheless, the container 3 can be formed having a round cross section. A capillary material in the form of a band 5 having a stiff design is attached to the container 3 as an application element, which band of material is depicted in FIGS. 1, 3c and 3d in the usage position thereof. In this usage position, a section of the band 5, which serves as a feed section 7, extends into the interior of the container 3 and is therefore in contact with the stored medium, in the present case, the liquid 1, while an upper longitudinal section of the band 5 is located outside of the container 3 as a delivery section 9. The delivery section 9 ends in a beveled discharge surface or marking surface 11, which is typical in the case of markers. The band 5 is made out of a sponge-like or felt-like material, which has capillaries, so that marking fluid 1, supplied in a wick-like manner, is available for application at the marking surface 11.

As can most clearly be seen in the detailed depiction of FIG. 2, the band 5 is enclosed by a sleeve-like retaining element 13 at the transition between the feed section 7 and the delivery section 9. In the present example, the retaining element is preferably made out of a thermoplastic plastic material, and has a radially projecting collar 15 on the circular cylindrical outside thereof. As can clearly be seen in FIG. 1, this collar serves to axially affix the retaining element 13, and in this way, the application element as a whole, to the neck section 17 of the container 3. A closure part 19 is connected to the neck section 17, which closure part forms a cap section 21, which encloses the application element, as well as a grip section 23. The closure part 19 can be removed from the closed position shown in FIG. 1 by manipulating the closure part by the grip section 23. As shown in FIG. 1, when in the closed position, the closure part 19 with the opening of the cap section 21 thereof is on a cylindrical surface 25 (FIG. 2) of the retaining element 13.

FIGS. 3a-3d show the sequence of the production process, starting with the molding of the container 3 (FIG. 3a). The container is subsequently filled with the fluid 1 (FIG. 3b). The application element with the band 5 having a capillary action is then inserted (FIG. 3c). FIG. 3d depicts the finished product, in which the band 5 of the application element is affixed to the neck section 17 of the container 3 through the molding of the retaining element 13 thereon. The container 3 is simultaneously sealed and the closure part 19 is formed.

FIGS. 4 and 5 show some components of a device for carrying out the sequence of procedures shown in FIGS. 3a-3d. The apparatus parts known to be provided for a conventional blow molding process such as an extruder apparatus for the formation of a plastic tube, to which apparatus a blow mandrel and filling mandrel are allocated for the fluid 1, are omitted in FIGS. 4 and 5 since these may be of a conventional type. FIG. 4 shows those stages of the production process, in which the plastic tube 27 is inserted via the opened head jaws 29 of a blow mold 31 into the closed, lower mold 33 thereof. In the closed lower mold 33, the plastic tube 27 is molded into the container 3, which is closed at the bottom 35 and filled with the fluid up to the filling level 37 by the blow mandrel (not shown). The flexible tube 27 is severed at a separation point 39 above the head jaws 29 to make an opening 41 accessible for the insertion of the application element 5. In so doing, vacuum-creating retaining jaws 43, which are located at the upper side of the head jaws 29, hold the opening of the flexible tube 41 open. FIG. 4 also shows that an application element 5 is removed from a magazine, which is not shown, by a movable transfer pusher 45 and transferred to a vacuum-creating retaining insert 47 of a horizontal carriage 49. This horizontal carriage can be moved vertically by a vertical cylinder 53 in a manner corresponding to the double arrow 51, and horizontally by a horizontal cylinder 55; see double arrow 57 of FIG. 5. Instead of the working cylinders, which are used here, conventional servo drives may also be used. FIG. 4 shows, in solid lines, the horizontal carriage 49 in a raised position, ready for the horizontal movement, which is carried out in a manner corresponding to the double arrow 57, into the insertion position shown in FIG. 5. The retaining insert 47 with the application element 5 can be moved in a manner corresponding to the double arrow 51 of FIG. 5 from this insert position, indicated with solid lines, into the insert position, which is indicated in FIG. 5 with dashed lines. After the insertion of the application element 5 and the raising of the horizontal carriage 49 from the insertion position shown as dashed lines in FIG. 5, the head jaws 29 can be closed. By molding the flexible tube 27 on the retaining element 13 of the application element 5, the application element is affixed to the neck section 17 and the container 3 is closed. At the same time, the closure part 19 is formed from the projecting flexible tube 27 extending through the head jaws 29. The inside of the head jaws 29 is formed in such a way that a constriction is formed in the wall of the flexible tube 27 above the collar 15 of the retaining element 13, so that a predetermined breaking point 59 is formed, see FIG. 1, at which the closure part 19 can be removed from the neck section 17 for the initial use of the applicator by manually manipulating the grip section 23.

Alternatively, instead of the method described thus far and instead of the above mentioned, movable mold parts 29 of the mold 31 for affixing the radially protruding collar 15 to the next section 17, a welding process may be used subsequent to the molding of the container 3, for example, implemented by externally applied, heated molding plates (not shown) or by using an ultrasonic method or a laser welding method.

While one embodiment has been chosen to illustrate the invention, it will be understood by those skilled in the art that various changes and modifications can be made therein without departing from the scope of the invention as defined in the claims.

The invention claimed is:

1. A method for producing an applicator for applying fluid or pasty media, comprising the steps of:
  forming a flexible tube out of thermoplastic plastic material;
  inserting the flexible tube into a mold;
  forming a container with a closed bottom from the flexible tube in the mold by expanding the flexible tube;
  at least partially filling the container located in the mold with the fluid or pasty medium;
  separating the container from a portion of the flexible tube locate outside of the mold to form an opening in the container at an upper side of the container;
  placing an application element through the opening and at least partially into the container through the opening in the container into a usage position of the application element in which the application element has a feed section extending into an interior of the container and a delivery section extending outside of the container such that the application element provides the medium for application outside of the container through capillary action, the application element having a sleeve-shaped retaining element at a transition between the feed section and the delivery section, the retaining element having a radially projecting collar on the outer cylindrical outside surface of the retaining element;

affixing the application element to the container in both axial directions thereof while simultaneously forming a closure of the container enclosing the delivery section by movable mold parts of the mold molding a neck section of the container on the radially projecting collar of the retaining element; and forming a predetermined breaking point between the neck section and the closure and above the radially extending collar for removal of the closure for an initial use of the application element while maintaining the affixing of the application element to the container in both of the axial directions.

2. A method according to claim 1 wherein
a protruding section of the flexible tube extending from the container is held open for insertion of the application element by applying a vacuum to an outside surface of the protruding section.

3. A method according to claim 2 wherein
the neck section is affixed to a cylindrical section of the retaining element above and below the radially projecting collar.

4. A method according to claim 1 wherein
the neck section is affixed to a cylindrical section of the retaining element above and below the radially projecting collar.

5. A method according to claim 1 wherein
the movable mold parts are positioned above the mold, are held open when the flexible tube is inserted into the mold and the application element is placed in the container, and are closed to affix the application element to the container.

6. A method according to claim 5 wherein
the portion of flexible tube is separated from the container above the movable mold parts.

7. A method according to claim 6 wherein
a protruding section of the flexible tube extending from the container is held open for insertion of the application element by applying a vacuum to an outside surface of the protruding section.

8. A method according to claim 1 wherein
the application element comprises a strip-shaped material forming the feed section and the delivery section and extending through the retaining element.

9. A method according to claim 1 wherein
the closure is formed by a portion of the flexible tube protruding above a fixing point of the application element and the neck section of the container.

10. A method according to claim 9 wherein
the breaking point is formed above the fixing point.

11. A method according to claim 1 wherein
the container is filled with a marking fluid.

* * * * *